US005688371A

United States Patent [19]
König et al.

[11] Patent Number: 5,688,371
[45] Date of Patent: Nov. 18, 1997

[54] PROCESS FOR FIXING DISRUPTIVE SUBSTANCES IN PAPERMAKING

[75] Inventors: Joachim König; Jürgen Kopp; Udo-Winfried Hendricks, all of Odenthal; Jürgen Reiners, Leverkusen; Peter Nowak, Dormagen, all of Germany

[73] Assignee: Bayer Aktiengesellschaft, Leverkusen, Germany

[21] Appl. No.: 664,768

[22] Filed: Jun. 18, 1996

Related U.S. Application Data

[63] Continuation-in-part of Ser. No. 401,950, Mar. 10, 1995, abandoned.

[30] Foreign Application Priority Data

Mar. 21, 1994 [DE] Germany ............... 44 09 580.5

[51] Int. Cl.$^6$ ............... D21H 21/02; D21H 17/54
[52] U.S. Cl. ............ 162/166; 162/164.1; 162/164.3; 162/164.6; 162/183; 162/DIG. 4
[58] Field of Search ............... 162/166, 164.3, 162/164.6, 164.1, 183, DIG. 4

[56] References Cited

U.S. PATENT DOCUMENTS

| | | | |
|---|---|---|---|
| 592,404 | 3/1897 | Hartan et al. | 162/164.6 |
| 3,734,889 | 5/1973 | Lipowski et al. | 162/164.3 X |
| 4,410,652 | 10/1983 | Robinson et al. | 524/195 |

FOREIGN PATENT DOCUMENTS

| | | | |
|---|---|---|---|
| 2093289 | 10/1993 | Canada | 162/166 |
| 2163760 | 3/1986 | United Kingdom | 8/496 |
| 91/09174 | 6/1991 | WIPO | 162/166 |

*Primary Examiner*—Donald E. Czaja
*Assistant Examiner*—Jose A. Fortuna
*Attorney, Agent, or Firm*—Connolly and Hutz

[57] ABSTRACT

Process for fixing anionic interfering substances in papermaking process by the addition of cationic polycondensation products obtained by reacting a) a monofunctional or polyfunctional amine having one or more primary and/or secondary and/or tertiary amino groups with b) cyanamide, dicyandiamide, guanidine or biguanidine, wherein up to 50 mol. % of cyanamide, dicyandiamide or biguanidine may be replaced with a dicarboxylic acid or a mono- or diester thereof, with elimination of ammonia, optionally in the presence of a catalyst, optionally together with other auxiliaries.

9 Claims, No Drawings

PROCESS FOR FIXING DISRUPTIVE SUBSTANCES IN PAPERMAKING

This application is a continuation in part of Ser. No. 08/401,950, filed Mar. 10, 1995, now abandoned.

FIELD OF THE INVENTION

The present invention provides a process for fixing interfering substances ("trash materials") in papermaking.

BACKGROUND AND PRIOR ART

Various water soluble and colloidally dissolved substances of an inorganic and in particular of an organic nature, arise on production and processing of chemical wood pulp, semichemical pulp, lignin and waste paper and enter the water circuit of the papermaking machine. The substances originate from the fresh water (salts and humic acids), from the raw materials (lignin derivatives and hemicellulose) and from the papermaking auxiliaries used (for example dispersants and binders).

Due to the trend in recent years to increase the concentration and closure of water circuits in paper mills in order to reduce fresh water consumption and effluent quantities, the concentration of these water soluble substances has risen considerably. As they considerably impair paper production, they are referred to as interfering substances.

According to Auhorn, Wochenblatt für Papierfabrikation 112, 37–48 (1984), interfering substances are dissolved or colloidally dissolved anionic oligomers or polymers and non-ionic hydrocolloids. They may result in coagulate formation and deposits in the white water circuit of papermaking machines and in the headbox, impair operation of the papermaking machine and may cause breaks in the web.

Deterioration in retention, draining, sheet formation and paper strength may also be observed. The activity of virtually all chemical auxiliaries is impaired by the interfering substances. Examples which may be mentioned are retention and drainage agents, wet-strength and dry-strength agents, sizing agents and dyes.

Binding these substances to the cellulose is described as fixing. In this manner, the substances are extracted from the white water circuit together with the paper, such that their concentration remains low.

Adding acid aluminium sulphate is ideally suitable for fixing these interfering substances onto the fibrous material, but, due to the current customary practice of operating in a neutral pH range and to the increasing use of calcium carbonate as a coating and filler pigment, if often no longer desirable.

Various anionic trash catchers have been proposed for neutral range papermaking, for example polydiallyl-dimethylammonium chloride (polyDADMAC)(Arheiliger & von Medvey, Wochenblatt für Papierfabrikation 114 (1986), 958), polymers based on quaternised dimethylaminopropyl acrylamides and methacrylamides (DE-OS 3 905 049) or also polyethyleneimines. These substances are, however, sufficiently active only in specific cases and impair paper properties such as whiteness. There was thus still a requirement for suitable anionic trash catcher, particularly for neutral range processing.

SUMMARY OF THE INVENTION

It has been found that cationic polycondensation products obtained by reacting a) a monofunctional or polyfunctional amine having one or more primary and/or secondary and/or tertiary amino groups with b) cyanamide, dicyandiamide, guanidine or biguanidine, wherein up to 50 mol-% of cyanamide, dicyandiamide, guanidine or biguanidine may be replaced with a dicarboxylic acid or a mono- or diester thereof, with elimination of ammonia, optionally in the presence of a catalyst, in which polycondensation product at least two amino groups a) have reacted with a compound b) under formation of the polycondensation product, are suitable for fixing interfering substances, preferably anionic interfering substances.

DESCRIPTION OF THE PREFERRED EMBODIMENTS

These polycondensation products are known, their production is, for example, described in DE-BP 855 001, DE-AS 2 112 878, DE-OS 3 525 104 and DE-OS 3 940 481. Those polycondensation produced according to DE-OS 3 940 481 in the presence of ammonium salts and optionally in the presence of organic solvents are, for example, particularly suitable.

Preferred polyfunctional amines a) are those which have at least two primary and/or secondary amino groups. Particularly preferred polyfunctional amines are obtainable by reacting a polyfunctional amine a) of the formula

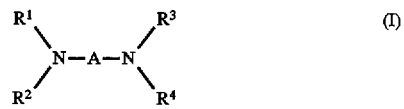

in which, independently of one another,

A denotes a substituted or unsubstituted alkylene chain which may be interrupted by hetero atoms and $R^1$–$R^4$ denote hydrogen, unsubstituted alkyl or alkyl which is substituted by a substituent selected from the group consisting of OH—, CN— and O—$C_1$–$C_4$-alkyl and preferably at least two of these radicals $R^1$–$R^4$ represent hydrogen, with b) cyanamide, dicyandiamide, guanidine or biguanidine, in an a)/b) molar ratio of 2:1 to 1:2, preferably 1.5:1 to 1:1.5 and especially preferably 1.2:1 to 1:1.2. Optionally the reaction is carried out in the presence of a catalyst, especially in the presence of 0.05–0.5 mol of an ammoniumn salt c) relative to the molar amount of b). In general, the reaction of a) with b) and optionally c) is carried out at temperatures of 80° to 160° C. in the presence of at least one non-aqueous solvent.

Preferred polyfunctional amines of the formula (I) are those wherein

A represents an unsubstituted $C_2$–$C_{20}$-alkylene chain or a $C_2$–$C_{20}$-alkylene chain which is substituted by OH and/or interrupted by O, S, NH or N-$C_1$–$C_4$-alkyl and $R^1$–$R^4$ independently of one another represent hydrogen or $C_1$–$C_4$-alkyl and at least two of $R^1$–$R^4$ represent hydrogen.

Examples for useful polyfunctional amines (I) are 1,4-butane diamine, 1,6-hexane diamine, N-(2-aminoethyl)-1,3 propane diamine, dipropylenetriamine, N,N-bis-(2-aminopropyl)-methylamine, polyethylene imines and especially polyethylene polyamines like triethylenetetramine, tetraethylenepentamine, pentaethylenehexamine and preferably diethylenetriamine.

Useful components c) are ammonium salts of organic or inorganic acids, for example ammonium chloride, ammonium sulphate, ammonium carbonate, ammonium formiate and ammonium acetate.

The reaction of components a) with b) and optionally c) is preferably carried out in the presence of at least one hydroxylgroup-containing solvent under elimination of ammonia. Examples for hydroxylgroup-containing solvents are ethylene glycol, 1,2- and 1,3-propylene glycol, butylene glycol, di-, tri- or tetraethylene glycol and ethers thereof and further polyethylene glycols with molecular weights of 600 to 5,000 or mixtures thereof.

The cationic polycondensation products are highly viscous liquids or solids with molecular weights of 200 to 20,000 g/mol (weight average).

In the reaction of components a) with b) it is possible to replace up to 50 mol-% of component b) with a dicarboxylic acid or a mono- or diester thereof. Suitable dicarboxylic acids are adipic acid, oxalic acid and terephthalic acid for example in form of their dimethyl esters.

By way of example, polycondensation products prepared from polyalkylene polyamines, in particular polyethylene polyamines, and guanidine, cyanamide and in particular dicyandiamide are suitable.

Those polycondensation products produced according to DE-OS 3 940 481 from polyethylene polyamines and dicyandiamide in a molar ratio of 2:1 to 1:2 in the presence of 0.05 to 0.5 mol of an ammonium salt related to the molar quantity of dicyandiamide, in the presence of an organic solvent containing hydroxyl groups are particularly preferred.

It is possible by using the polycondensation products according to the invention decisively to improve the activity of most customary papermaking aids. Positive effects may be achieved, for example in accelerating drainage in the presence of customary retention and drainage aids based on polyethyleneimines, polyamideamines and polyacrylamides. The activity of customary wet-strength agents based on polyamide-epichlorohydrin resins is decisively improved. Particularly positive effects are achieved when the anionic trash catchers according to the invention are combined with OX-free wet-strength agents (containing no organically bound halogen) based on water-dispersible non-ionic, anionic or cationic polyisocyanates, as described in DE-OS 4 211 480 and the prior German patent applications P 226 110.4 and P 19 520 092.6. Anionic trash catchers are also suitable for improving the activity of customary pulp sizing agents, dry-strength agents as cationic starch and for increasing colour strength in substantive and cationic paper dyes.

The anionic trash catchers according to the invention may be used in quantities of 0.01 to 5% related to the chemical pulp. Quantities of 0.1 to 2% are preferred.

Optimum usage of the anionic trash catchers is dependent upon the interfering substance loading of the white water system of the paper machine and may be determined by preliminary testing or by monitoring the loading of the white water system, for example by polyelectrolyte titration or by zeta potential measurement. Overdosage of the anionic trash catcher is to be avoided as the activity of the papermaking auxiliaries may again be impaired in such cases.

PRODUCTION OF CATIONIC POLYCONDENSATION PRODUCTS ACCORDING TO DE-OS 3 940 481

Example 1

277.2 parts of dicyandiamide are suspended in 240 parts diethylene glycol and mixed with 309 parts of diethylenetriamine, wherein the temperature rises to approx. 40° to 45° C. 24 parts of ammonium chloride are added and the mixture is heated to 110° C. in 20 minutes, wherein ammonia is liberated from 50° C. The escaping ammonia is caught in a low-temperature trap. The reaction mixture is heated to 150° C. by continuously increasing its temperature over 2 hours and stirred for 60 minutes at 150° C. Liberation of ammonia has then virtually completely stopped and a clear, highly viscous melt has been produced. The reaction mixture is then allowed to cool to approx. 140° C. and 600 parts of water are rapidly added, wherein a clear solution is produced which is cooled to 40° to 50° C. The solution is adjusted to a pH of 6.5 to 7.0 by adding 275 parts of 36.5% hydrochloric acid while cooling the mixture. 1555 g of a clear, light yellow solution with a dry content of 49.5%, which is adjusted to a solids content of 42% by dilution with water.

TESTING OF ANIONIC TRASH CATCHERS

Practical Example 1

Practical example 1 demonstrates the activity of the cationic polycondensation products on drainage of waste paper. Stock drainage is tested using the Schopper-Riegler method, wherein the drainage time of a specific quantity of water is measured.

The test pulp used is prepared from waste paper as follows: 120 g of old newspaper and 30 g of screenings are slushed for approx. 30 minutes in 4.5 l of hot water and then beaten in a Pendraulic stirrer for 15 minutes at maximum speed (approx. 5,000 rpm) until a freeness of approx. 60° SR is achieved.

After beating, 15 g of china clay and 0.75 g of aluminium sulphate together with 1 g of a 50% black liquor from sulphite pulp production as disruptive substance are added and the mixture made up as a total volume of 10 l, giving a stock density of 1.5%.

200 ml of this mixture are poured into a freeness beaker, made up to a total volume of 1 l with water and introduced into a freeness tester. The time taken for 700 ml of water to drain out is measured, wherein this value is used as a blank reading.

If 9 mg of a customary commercial polyamideamine-based retention agent are added to this mixture, a lower drainage value is measured as a zero value, which is, however, not yet adequate for practical conditions.

If further testing, increasing quantities of the anionic trash catcher (42% solution) produced according to example 1 are added to the stock system before the retention agent in order to fix the interfering substances present. In this manner, the drainage time is further reduced depending upon the added quantity of anionic trash catcher until a desired level for practical conditions is achieved (table 1).

TABLE 1

| Schopper-Riegler drainage tests | | |
|---|---|---|
| Anionic trash catcher according to example 1 (42% solution) (Quantity used in % related to the pulp) | Polyamideamine drainage agent (38% solution) (Quantity used in % related to pulp) | Drainage time (sec) |
| Blank value 0 | 0 | 175 |
| Zero value 0 | 0.3 | 98.5 |

TABLE 1-continued

Schopper-Riegler drainage tests

| Anionic trash catcher according to example 1 (42% solution) (Quantity used in % related to the pulp) | Polyamideamine drainage agent (38% solution) (Quantity used in % related to pulp) | Drainage time (sec) |
| --- | --- | --- |
| Process according to the invention 0.05 | 0.3 | 72.6 |
| Process according to the invention 0.1 | 0.3 | 59.7 |
| Process according to the invention 0.2 | 0.3 | 51.2 |

Practical Example 2

Practical example 2 demonstrates the activity of the anionic trash catcher on wet-strength finishing of paper:

100 g of a bleached sulphite pulp with a stock density of 2.5% and heavily loaded with interfering substances are placed in a glass beaker and diluted to 1000 ml with water.

Both a conventional wet-strength agent based on a polyamideamine-epichlorohydrin resin (15% aqueous solution) and an OX-free wet-strength agent based on a weakly cationic, hydrophilised polyisocyanate prepared according to DE-OS 4 211 480 (80% solution in an organic solvent) were used. The wet-strength agents are diluted before use to a 1% aqueous solution or 1% aqueous dispersion respectively and added in this form to the pulp suspension described above. The mixture is stirred for 5 minutes at room temperature and paper sheets with a basis weight of 80 g/m² are formed on a sheet former (Rapid-Köthen unit). The sheets of paper are dried for 10 minutes at 90° C. and heated for a further 10 minutes at 110° C. in the drying cabinet.

After conditioning at room temperature, 5 test strips of 1.5 cm in width are cut from each sheet of paper and immersed for 5 minutes in tap water. The wet strips are then immediately tested for wet breaking strain in a breaking length tester.

The results are reproduced in Table 2 (quantities stated as percentage of commercial product related to pulp).

As the table shows, only very low and unsatisfactory wet strengths are found in pulp systems containing interfering substances with customary quantities of wet-strength agents (tests B and E). Adequate wet strengths are on the other hand achieved only with extremely high, uneconomic quantities of wet-strength agents (test F) or after removal of the interfering substances by means of equally technically undesirable pulp washing in a filtration process (tests A and D).

However, if the quantities of anionic trash catcher staged in Table 2 are added to the stock systems containing interfering substances before addition of the wet-strength agent, any interfering substances present are scavenged, such that full wet-strength action may be achieved (tests C and G).

TABLE 2

Wet strengthening of paper

| | Stock system | Wet-strength agent (quantity used in % related to stock) | Anionic trash catcher (quantity used in % related to stock) | Wet breaking strain (N) |
| --- | --- | --- | --- | --- |
| A | containing no interfering substances | 6% polyamideamine epichlorohydrin resin (15% solution) | — | 15.4 |
| B | containing interfering substances | 6% polyamideamine epichlorohydrin resin (15% solution) | — | 6.8 |
| C | containing interfering substances | 6% polyamideamine epichlorohydrin resin (15% solution) | 1% cationic polycondensation product according to example 1 (42% solution) | 14 |
| D | containing no interfering substances | 1% cationic hydrophilised polyisocyanate (80% solution in propylene glycol diacetate) | — | 13.2 |
| E | containing interfering substances | 1% cationic hydrophilised polyisocyanate (80% solution in propylene glycol diacetate) | — | 2.2 |
| F | containing interfering substances | 3% cationic hydrophilised polyisocyanate | — | 13.6 |
| G | containing interfering substances | 1% cationic hydrophilised polyisocyanate | 0.5% cationic polycondensation product according to example 1 | 14.3 |

What is claimed is:

1. A process for fixing anionic interfering substances in papermaking by the addition of an anionic trash catcher to a papermaking stock, wherein the anionic trash catcher comprises a cationic polycondensation product obtained by reacting:

a) a polyfunctional amine of the formula

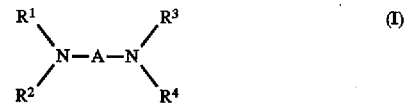

in which, independently of one another,

A denotes a substituted or unsubstituted alkylene chain which may be interrupted by hetero atoms and $R^1$–$R^4$ denote hydrogen, unsubstituted alkyl or alkyl which is substituted by a substituent selected from the group consisting of OH—, CN— and O-$C_1$-$C_4$-alkyl, with b) cyanamide, dicyandiamide, guanidine or biguanidine, in an a)/b) molar ratio of 2:1 to 1:2 in which polycondensation product at least two amino groups of a) have reacted with a compound b) to form the polycondensation product.

2. The process of claim 1, wherein the polyfunctional amine of the formula (I), at least two of the radicals $R^1$–$R^4$ represent hydrogen.

3. The process of claim 1, wherein the reaction of a) with b) is carried out in the presence of 0.05 to 0.5 mol of an ammonium salt catalyst c) relative to the molar amount of b).

4. The process of claim 1, wherein the cationic polycondensation product has a molecular weight of 200 to 20,000 g/mol (weight average).

5. The process of claim 1, wherein the cationic polycondensation product is the reaction product of a compound of formula I with dicyandiamide.

6. The process of claim 1, wherein the cationic polycondensation product is used together with cationic, anionic or non-ionic papermaking auxiliaries.

7. The process of claim 1, wherein the cationic polycondensation product is used together with retention agents and drainage aids.

8. The process of claim 1, wherein the cationic polycondensation product is used together with a polyamideamine-epichlorohydrin resin wet strength agent.

9. The process of claim 1, wherein the cationic polycondensation product is used together with a hydrophilized polyisocyanate wet strength agent.

* * * * *